United States Patent [19]
Asquith

[11] 3,732,952
[45] May 15, 1973

[54] BRAKE ADJUSTERS

[75] Inventor: Anthony Asquith, Nuneaton, England

[73] Assignee: Girling Limited, Birmingham, England

[22] Filed: Mar. 30, 1971

[21] Appl. No.: 129,336

[30] Foreign Application Priority Data

Apr. 3, 1970   Great Britain...................15,854/70

[52] U.S. Cl............................188/71.9, 188/196 D
[51] Int. Cl.............................................F16d 65/56
[58] Field of Search.................188/71.9, 79.56 E, 188/196 B, 196 D, 196 BA

[56]   References Cited
UNITED STATES PATENTS

| | | | |
|---|---|---|---|
| 2,270,600 | 1/1942 | Ohlson | 188/196 B |
| 2,788,095 | 4/1957 | Brooks | 188/196 B |
| 3,633,712 | 1/1972 | Farr | 188/196 D |

FOREIGN PATENTS OR APPLICATIONS 1,319,419   1/1963   France...................188/71.9

*Primary Examiner*—Duane A. Reger
*Attorney*—Scrivener, Park, Scrivener & Clarke

[57]   ABSTRACT

A slack adjuster for a vehicle braking system including first and second members having a normally reversible screw-thread connections therebetween, the first and second members are supported in first and second pistons respectively of the braking system and excessive displacement of the pistons causes relative displacement between said first and second member to reduce the displacement of the pistons on the succeeding stroke. One of the first and second members may be a split nut and a wedge member can be provided for urging the split nut against the other of the first and second members to prevent relative rotation therebetween under a brake-applying thrust.

12 Claims, 1 Drawing Figure

BRAKE ADJUSTERS

The present invention relates to an automatic slack adjuster for vehicle brakes.

As is well known, it is desirable to limit the return travel of a brake actuating member, such as a hydraulic piston, of a vehicle brake system so that excessive pedal (or hand lever) travel will not be encountered the next time the brakes are applied. An automatic brake adjuster may be provided which comes into operation as a result of travel of such brake actuating member in the brake-applying direction in excess of the desired travel. Upon such excessive travel the adjuster adjusts the limit of return travel of said brake actuating member which occurs when the brakes are released.

According to the present invention, a slack adjuster for a vehicle brake system includes two members having a normally reversible screw-thread connection between one another and a further member is provided for urging the two first-mentioned members towards one another in a radial direction with respect to the screw-thread connection and thereby into strong frictional engagement with one another when a brake-applying force is applied between said two members.

Thus, the reversible screw-thread connection secures relative rotation between the two screw-threaded members when adjustment is required and the further member acts to prevent the two screw-threaded members from being screwed back in the reverse direction when the adjuster is subjected to a brake-applying force.

A pawl and ratchet mechanism may be fitted at least indirectly between the screw-threaded members to prevent unintentional reverse rotation in other circumstances.

Advantageously the adjuster is associated with a piston of a hydraulic actuator and an auxiliary mechanical actuator, such as a handbrake, acts on the piston through the adjuster.

The invention is further described, by way of example, with reference to the accompanying drawings, in which.

Figure 1:
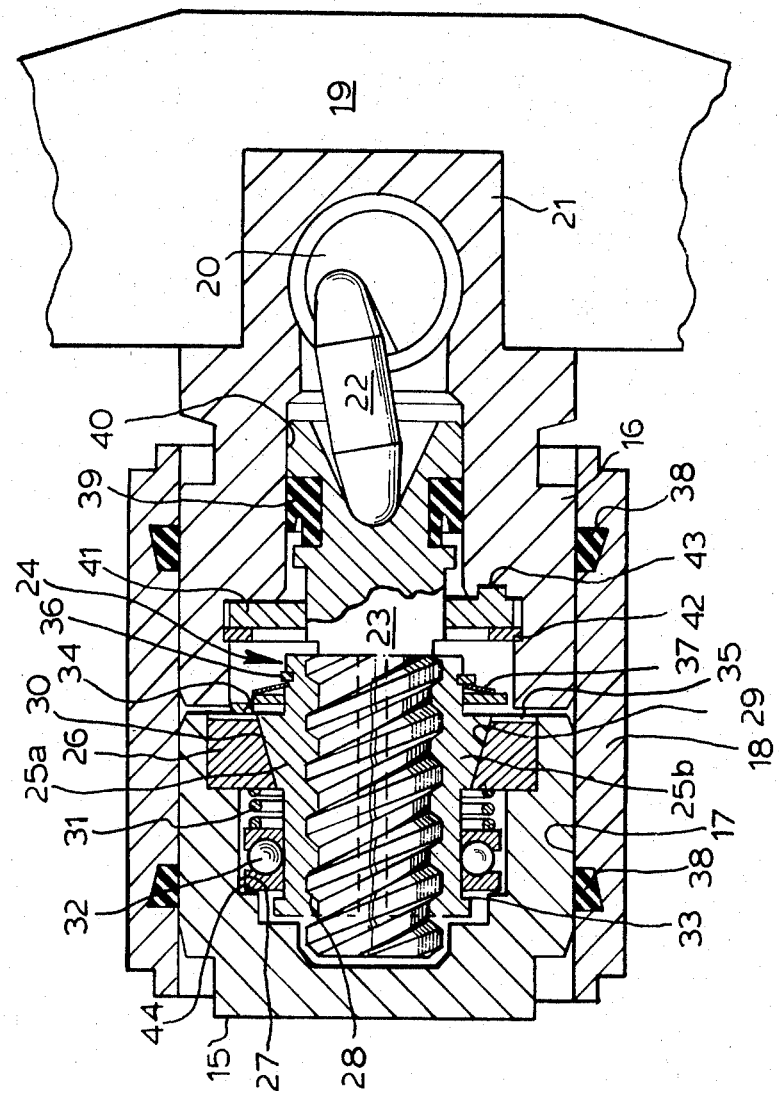
FIG. 1 is a sectional view of a hydraulic actuator of a reaction type caliper disc brake of the kind described in British Patent Specifications Nos. 1,075,371 and 1,147,639 and fitted with an automatic adjuster.

In the said reaction type caliper disc brake the hydraulic actuator is disposed between a first disc pad and a yoke arranged for displacement relative to the axis of the disc. The yoke extends to the side of the disc remote from the first disc pad and supports a second friction disc pad in opposition to said first disc pad. Expansion of the hydraulic actuator causes the first disc pad and the adjacent parts of the yoke to be urged further apart so that the first and second disc pads are pressed against the disc. Contraction of the hydraulic actuator allows the first pad and the adjacent part of the yoke to approach one another so that the first and second disc pads can lose contact with the disc.

It will be appreciated that the actual displacement of the first pad relative to the second pad between braking engagement with the disc and the disengaged positions of the discs is very small in this type of brake system and the direction of force applied by the hydraulic actuator is perpendicular to the plane of the brake disc.

Referring to the drawing, a hydraulic actuator comprises a pair of opposed pistons 15 and 16 slidable in a through bore 17 in a fixed body member 18. The body member 18 is mounted at one side of a disc (not shown) and the piston 15 acts on a friction pad cooperating with that side of the disc. The piston 16 acts on a yoke 19 which is slidably supported on the body member 18 (as can be understood more fully from the above-mentioned Patent Specifications) and which acts on an indirectly operated friction pad at the other side of the disc.

An auxiliary mechanical actuator is also provided and comprises a cam 20 which is journalled in an extension 21 on the piston 16 and which acts through a dolly 22 on a strut 23. The strut 23 forms part of an automatic adjuster 24 which includes a split nut 25a, 25b, and a wedge member 26. The adjuster 24 is for the most part accommodated within the piston 15 which is hollow and the wedge member 26 is secured in the end of the blind bore 27 in this piston.

The nut 25a, 25b has a reversible screw-thread connection 28 with the strut 23. A reversible screw-thread connection is a connection such that axial displacement of the nut relative to the screw causes relative rotation therebetween and vice versa. Whether a screw-thread connection is reversible or not depends upon the pitch and flank angles of the thread and the coefficient of friction between the nut and the screw. The wedge member 26 has an internal frusto-conical surface 29 cooperating with complementary surfaces 30 on the split nut 25a, 25b. A compression spring 31 acts between the wedge member 26 and a ball race 32 which engages a shoulder 44 inside the piston 15 and which cooperates with a collar 33 on one end of the nut 25a, 25b to urge the split nut 25a, 25b to the left when adjustment is required.

A pawl 34 cooperates with ratchet teeth 35 on the wedge member 26 and is retained on the nut 25a, 25b by a spring ring 36 and a Belleville washer 37.

Seals 38 seal the pistons 15 and 16 to the bore 17 and a seal 39 seals the strut 23 to a bore 40 in the indirectly operating piston 16. A locating plate 41 held in place in the piston 16 by a spring ring 42 prevents the strut 23 from turning relative to the piston 16 which is itself prevented from turning by the yoke 19. For this purpose the locating plate 41 has a spigot 43 engaging in the piston 16 and has a key engaging in a keyway (not shown) in the strut 23.

During normal operation of the brake hydraulically, the hydraulic fluid is applied to the space between the pistons 15 and 16 to urge these pistons apart and thereby urge the pads against the opposite sides of the disc. The hydraulic pressure acts on the left hand end of the strut 23 to urge this strut to the right relative to the piston 15 and thereby holds this strut in abutment with the dolly 22, the cam 20 being held in its illustrated position by stop means (not shown). The clearance between the ball race 32 and the split nut 25a, 25b is sufficient to permit relative axial movement between the two pistons 15 and 16 without affecting the screw-thread connection 28 during normal piston travel. On the other hand, if there is excessive piston travel this clearance is taken up and the strut 23 tends to move the nut 25a, 25b further to the right against the force of the spring 31. However, rather than move further to the right the nut 25a, 25b is caused to turn on the strut 23 by the reversible screw-thread connection 28 thereby effecting automatic adjustment so that the next time the pistons 15 and 16 come to rest they cannot approach quite so closely towards one another.

When the handbrake is applied, the cam 20 is turned in an anti-clockwise direction thereby urging the piston 15 to the left relative to the piston 16 so that the brake pads are applied as before. However, in this case the brake-applying force is transmitted through the automatic adjuster, i.e. between the strut 23 and the split nut 25a, 25b. Since the screw-thread connection 28 is a reversible connection means must be provided for preventing relative rotation upon handbrake application and this means comprises the wedging surfaces 29 and 30. The brake-applying force is transmitted between the two halves 25a and 25b of the split nut and the wedge member 26 at these edging surfaces which thereby urge the two halves 25a and 25b towards one another thereby clamping the strut 23 therebetween and preventing relative axial movement and consequent relative rotation. The wedging surfaces 29 and 30 themselves act as a friction clutch further ensuring that the nut 25a, 25b cannot rotate.

The ratchet 34, 35 serves to prevent the nut 25a, 25b from rotating in the reverse direction due to "knock back" and due to vibration.

Figure 4:
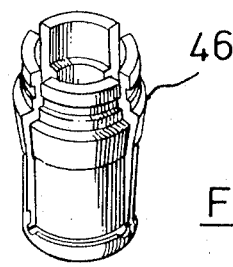
FIGS. 3 and 4 are perspective views of two further embodiments of split nut.
Figure 2:
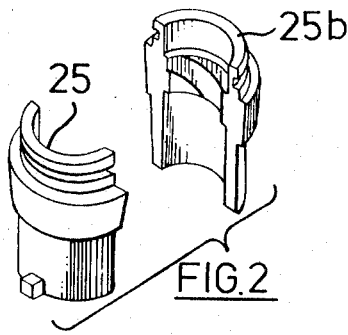
FIG. 2 is an exploded perspective view of the split nut of the adjuster of FIG. 1.
Figure 3:
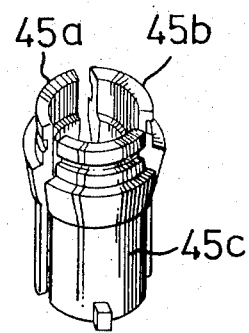

While the split nut 25a, 25b is illustrated in FIGS. 1 and 2 as being in tow parts it may be in a greater number of parts, e.g. three parts 45a, 45b, 45c as shown in FIG. 3. Alternatively, the nut need not be split into several parts. Rather, as is shown in FIG. 4, the nut 46 may be longitudinally slit, at least in the region of the wedge member, and at the same time have sufficient flexibility to enable it to be clamped against the strut. A further possibility is for the strut to be split or slit instead of the nut. In this case the wedge member extends inside the split or slit strut and acts radially outwardly on the strut.

I claim:

1. A slack adjuster for a vehicle braking system including first and second members having a normally reversible screw thread connection therebetween such that in one direction of axial load between said first and second members relative rotation is effected therebetween, and means effective upon axial loading in a direction opposite to said one direction for urging relative radial displacement between said first and second members to hold the first and second members in frictional engagement with one another at said reversible screw thread connection to prevent relative rotation therebetween.

2. A slack adjuster as claimed in claim 1, in which said second member comprises a longitudinally split member divided into circumferentially spaced portions having said reversible screw thread connection with and radially displaceable relative to said first member, and in which said further member and said portions of said second member have interengageable wedging surfaces thereon for urging said portions of said second member into frictional engagement with said first member.

3. A slack adjuster as claimed in claim 2, in which said second member comprises a split nut, and in which said wedging surfaces comprise external and internal conical surfaces on said split nut and on said further member, respectively.

4. A slack adjuster as claimed in claim 2, in which spring means is disposed between said second member and said further member and acts therebetween in a direction to urge said wedging surfaces into engagement with one another.

5. A slack adjuster, for a vehicle braking system comprising first and second pistons disposed in a common cylinder and arranged to be displaced apart when a brake applying force is applied to the brake system, a first member slidably disposed within said first piston and defining a screw-threaded portion extending at least partially into said second piston, a second member within said second piston threadedly engaged on said screw-threaded section and a further member engageable with said second member for urging said second member radially into engagement with said screw-threaded portion.

6. A slack adjuster, as claimed in claim 5 and wherein said first member is restrained against radial displacement relative to the first piston and is axially displaceable within fixed limits within said first piston, and said second member is rotatably disposed within the second piston and is slidably displaceable, within limits, within said second piston.

7. A slack adjuster as claimed in claim 5 and wherein a spring means acts between the further member and said second member to urge said second member radially into engagement with said screw-threaded portion.

8. A slack adjuster, as claimed in claim 5, and wherein excessive travel of the two pistons during a braking operation causes rotation of the second member relative to the screw-threaded portion of said first member whereby to reduce the travel of the pistons during a succeeding braking operation.

9. A slack adjuster for a vehicle braking system including a cylinder, first and second pistons slidably disposed in said cylinder and adapted to be displaced apart when a braking force is applied to the braking system, a first member slidably disposed, in said first piston within fixed limits and restrained against rotation relative to said first piston, said first member defining a screw-threaded shaft section extending into said second piston, a second member slidable and rotatable within said second piston and defining threaded regions engaged with said screw-threaded shaft, and a further member defined by a ring surrounding the said second member and presenting a conical surface for engagement with a complementary surface defined by said second member, and means limiting the axial displacement of the second member within said second piston.

10. A slack adjuster as claimed in claim 9 and wherein the first part of the axial displacement of the second member relative to the second piston is unrestrained and further axial displacement, as the piston separation increases, is resiliently resisted by spring means.

11. A slack adjuster as claimed in claim 9 in which the second member comprises a split nut presenting first and second end faces and defining near said first end face a conical surface for engagement with said conical surface of said further member and, at or near said second end face a radial flange, a thrust bearing, slidable on said split nut between said flange and said conical surface, and a compression spring means between said thrust bearing and said further member.

12. A slack adjuster, for a vehicle braking system, including first and second members having a normally reversible screw-thread connection between them, a further member surrounding said second member for urging said second member radially towards said first member, and means engaging said first member capable of causing the brakes to operate, said means including a dolly and a cam, said dolly extending between said first member and said cam and said cam, when rotated acting through the dolly to cause relative displacement between said first member and another moving part of the brake system.

* * * * *

Disclaimer 3,732,952.—*Anthony Asquith*, Nuneaton, England. BRAKE ADJUSTERS. Patent dated May 15, 1973. Disclaimer filed Sept. 11, 1974, by the assignee, *Girling Limited*.

Hereby enters this disclaimer to claims 4 and 7 of said patent.

[*Official Gazette November 12, 1974.*]

UNITED STATES PATENT OFFICE
CERTIFICATE OF CORRECTION

Patent No. 3,732,952            Dated May 15, 1973

Inventor(s) Anthony Asquith

It is certified that error appears in the above-identified patent and that said Letters Patent are hereby corrected as shown below:

Claim 2, line 1 after "which" the following should be inserted:

-- said means for urging said radial displacement comprises a further member and --.

Signed and Sealed this

Ninth Day of November 1976

[SEAL]

Attest:

RUTH C. MASON
*Attesting Officer*

C. MARSHALL DANN
*Commissioner of Patents and Trademarks*